(12) United States Patent
Herring

(10) Patent No.: US 11,419,321 B2
(45) Date of Patent: Aug. 23, 2022

(54) APPARATUS AND METHOD FOR EMBEDDING A SCENT IN A FISHING LURE

(71) Applicant: Paul M. Herring, Mt. Pleasant, SC (US)

(72) Inventor: Paul M. Herring, Mt. Pleasant, SC (US)

(*) Notice: Subject to any disclaimer, the term of this patent is extended or adjusted under 35 U.S.C. 154(b) by 377 days.

(21) Appl. No.: 16/804,263

(22) Filed: Feb. 28, 2020

(65) Prior Publication Data

US 2020/0196582 A1    Jun. 25, 2020

Related U.S. Application Data

(62) Division of application No. 15/621,633, filed on Jun. 13, 2017, now Pat. No. 10,582,703.

(60) Provisional application No. 62/433,428, filed on Dec. 13, 2016.

(51) Int. Cl.

| | |
|---|---|
| *A01K 85/01* | (2006.01) |
| *A01K 97/04* | (2006.01) |
| *B05D 1/00* | (2006.01) |
| *A01K 83/00* | (2006.01) |
| *B05D 1/18* | (2006.01) |
| *B05D 7/24* | (2006.01) |

(52) U.S. Cl.
CPC .............. *A01K 85/01* (2013.01); *A01K 97/04* (2013.01); *B05D 7/24* (2013.01); *A01K 83/00* (2013.01); *B05D 1/18* (2013.01); *B05D 1/60* (2013.01); *B05D 2258/00* (2013.01)

(58) Field of Classification Search
CPC .......... A01K 85/01; A01K 97/04; B05D 1/16; B05D 2258/001

USPC .............................................. 43/42.53, 42.06
See application file for complete search history.

(56) References Cited

U.S. PATENT DOCUMENTS

| | | | | | |
|---|---|---|---|---|---|
| 3,308,570 | A | * | 3/1967 | Horton ................... | A01K 97/04 |
| | | | | | D22/136 |
| 3,798,048 | A | * | 3/1974 | Brody ................... | B05C 19/002 |
| | | | | | 118/640 |
| 3,835,572 | A | * | 9/1974 | Mounsey ............... | A01K 85/01 |
| | | | | | 43/42.06 |
| 4,589,223 | A | * | 5/1986 | Hastings ............... | A01K 97/045 |
| | | | | | 43/42.24 |
| 4,726,138 | A | * | 2/1988 | Hurt ....................... | A01K 97/04 |
| | | | | | 43/4.5 |
| 4,771,564 | A | * | 9/1988 | Whitley ................. | A01K 97/04 |
| | | | | | 43/25 |
| 4,823,497 | A | * | 4/1989 | Pierce .................... | A01K 85/01 |
| | | | | | 43/44.99 |

(Continued)

*Primary Examiner* — Christopher P Ellis
(74) *Attorney, Agent, or Firm* — K&L Gates LLP

(57) ABSTRACT

A device for adding a scent to a fishing lure, the device including: at least one electrode; and (i) a conductive element configured to place the fishing lure in conductive communication with the at least one electrode; and a control unit configured to activate the at least one electrode to cause the at least one electrode to impart a charge on the fishing lure via the conductive element, or (ii) a source of scented liquid; a heating mechanism; and a control unit configured to (a) activate the at least one electrode to cause the at least one electrode to impart a charge on the fishing lure, and (b) create steam from the scented liquid, wherein ions from the steam are attracted to the fishing lure when the charge is imparted on the fishing lure by the at least one electrode.

17 Claims, 4 Drawing Sheets

(56) References Cited

U.S. PATENT DOCUMENTS

| | | | | |
|---|---|---|---|---|
| 5,097,616 A * | 3/1992 | Johnston, Jr. | A01K 85/01 43/25 |
| 5,170,582 A * | 12/1992 | Morgin | A01K 97/04 43/54.1 |
| 5,187,890 A * | 2/1993 | Johnston | A01K 85/01 43/25 |
| 5,269,087 A * | 12/1993 | Johnston | A01K 85/01 43/25 |
| 5,297,354 A * | 3/1994 | McGriff | A01K 97/06 43/55 |
| 5,415,862 A * | 5/1995 | Bethshears | A23K 50/80 43/42.31 |
| 5,707,696 A * | 1/1998 | Boxler | C08K 11/00 428/36.5 |
| 5,775,023 A * | 7/1998 | Botkins | A01K 97/04 43/4 |
| 5,956,881 A * | 9/1999 | Dehm | A01K 97/00 43/4 |
| 6,061,947 A * | 5/2000 | Mooers | A01K 85/01 43/42.47 |
| 6,174,525 B1 * | 1/2001 | Kelley | B01J 13/0065 524/916 |
| 6,748,693 B1 * | 6/2004 | Snyder | A01K 85/01 426/1 |
| 7,805,878 B2 * | 10/2010 | Thomsen | A01K 85/01 43/4 |
| 10,264,770 B1 * | 4/2019 | Morales | A01K 85/01 |
| 2003/0046857 A1 * | 3/2003 | Paulsen | A01K 97/02 43/42.06 |
| 2004/0216355 A1 * | 11/2004 | Gore | A01K 79/02 43/17.5 |
| 2005/0229475 A1 * | 10/2005 | Dobbs | A01K 97/045 43/55 |
| 2005/0233071 A1 * | 10/2005 | Fung | B05C 19/001 427/180 |
| 2006/0262548 A1 * | 11/2006 | Schmidt | A01K 97/00 362/410 |
| 2007/0220798 A1 * | 9/2007 | Davidson | A01K 91/20 43/43.12 |
| 2008/0000140 A1 * | 1/2008 | Mitchell | A01K 85/01 43/42.06 |
| 2008/0150186 A1 * | 6/2008 | Abrams | B29C 45/14811 156/182 |
| 2011/0203157 A1 * | 8/2011 | Konz | A01K 97/04 43/17.5 |
| 2015/0289490 A1 * | 10/2015 | Black | A01K 85/01 427/160 |
| 2018/0160668 A1 * | 6/2018 | Herring | A01K 97/04 |
| 2020/0048524 A1 * | 2/2020 | Crawford, Sr. | A01M 1/2061 |
| 2020/0329686 A1 * | 10/2020 | Herring | A01K 85/01 |

* cited by examiner

APPARATUS AND METHOD FOR EMBEDDING A SCENT IN A FISHING LURE

PRIORITY

This application claims priority to and the benefit as a divisional application of U.S. application Ser. No. 15/621,633, entitled "Apparatuses and Methods for Embedding a Scent in a Fishing Lure", filed Jun. 13, 2017, which claims priority to and the benefit of U.S. Provisional Application No. 62/433,428, entitled "Apparatuses and Methods for Embedding a Scent In a Fishing Lure", filed Dec. 13, 2016, the entire contents of each of which are incorporated herein by reference and relied upon.

FIELD OF THE DISCLOSURE

The present disclosure relates generally to methods and apparatuses for embedding a scent in a fishing lure, and more specifically to methods and apparatuses that use one or more of a temperature change, a pressure change and an electrical or magnetic charge to embed a scent in a fishing lure.

BACKGROUND OF THE DISCLOSURE

Fish are attracted to scents. For this reason, many fishermen either purchase scented baits or apply scents to fishing lures to increase their chances of catching fish. When a scent is applied to a fishing lure, it is typically applied by coating the fishing lure with a liquid and allowing the liquid to dry. For example, a scented liquid can be sprayed onto a fishing lure, or the fishing lure can be dipped into the scented liquid. These methods, however, do not always ensure that the scent will remain with the fishing lure for an extended period of time, meaning that the scents must be constantly reapplied. These methods thus cause the fisherman to constantly handle the fishing lure, enabling oils from the fisherman's own hands to transfer to the fishing lure or the scents to transfer from the fishing lure to the fisherman. Many scented liquids that are used to coat fishing lures are also messy to handle.

SUMMARY OF THE DISCLOSURE

The present disclosure is directed to methods and apparatuses for embedding scents in fishing lures. In a general example embodiment, a device for adding a scent to a fishing lure includes a body including an inner space configured to be isolated from an outside environment and a container for a scented liquid, an attachment mechanism configured to suspend the fishing lure within the inner space of the body, a heating mechanism configured to raise the temperature of the scented liquid to create steam, and a control unit configured to cause at least one of: (i) a pressurization mechanism to increase pressure within the inner space to cause the steam to add a scent to the fishing lure; or (ii) a charge to be applied to the fishing lure to cause the steam to add the scent to the fishing lure.

In another embodiment, the control unit is configured to cause the pressurization mechanism to increase pressure within the inner space to cause the steam to add the scent to the fishing lure.

In another embodiment, the pressurization mechanism increases pressure within the inner space by pumping the steam into the inner space.

In another embodiment, the control unit is configured to cause the charge to be applied to the fishing lure to cause the steam to add the scent to the fishing lure.

In another embodiment, the attachment mechanism places the fishing lure in conductive communication with an electrode, and the control unit causes the charge to be applied by activating the electrode.

In another embodiment, the control unit causes both of (i) and (ii) to occur.

In another embodiment, the container is located within the inner space of the body, and the attachment mechanism enables the fishing lure to be lowered into the container of scented liquid.

In another embodiment, the heating mechanism includes a portion that directly contacts the scented liquid within the container.

In another embodiment, the charge is an electrical charge or a magnetic charge.

In a general example embodiment, a device for applying a charge to a fishing lure includes at least one electrode, a conductive element configured to place the fishing lure in conductive communication with the at least one electrode, and a control unit configured to activate the at least one electrode to cause the at least one electrode to impart a charge on the fishing lure via the conductive element In another embodiment, the device includes a container for a scented liquid.

In another embodiment, the conductive element places the fishing lure in conductive communication with one of a cathode or an anode, and the container includes the other of the cathode and the anode.

In another embodiment, the device includes a heating mechanism to create steam from the scented liquid, and ions from the steam are attracted to the fishing lure when the charge is imparted on the fishing lure by the at least one electrode.

In another embodiment, the heating mechanism includes a portion that directly contacts the scented liquid within the container.

In another embodiment, the device includes a pressurization mechanism configured to adjust the pressure within an inner space of a body including the conductive element.

In another embodiment, the pressurization mechanism is configured to adjust the pressure within the inner space by pumping steam into the inner space In another embodiment, the conductive element places the fishing lure in conductive communication with one of a cathode or an anode, and the other of the cathode and the anode is located elsewhere within an inner space of a body including the conductive element.

In a general example embodiment, a method of adding a scent to a fishing lure includes placing a fishing lure in conductive communication with an electrode, placing the fishing lure in contact with or in proximity to a scented liquid, and activating the electrode to cause the fishing lure to attract ions from the scented liquid.

In another embodiment, the method includes placing the fishing lure in contact with the scented liquid.

In another embodiment, the method includes lowering the fishing lure into contact with the scented liquid.

In another embodiment, the method includes heating the scented liquid so that the scented liquid is in the form of steam when activating the electrode the electrode to cause the fishing lure to attract the ions from the scented liquid.

In another embodiment, the method includes sealing the fishing lure inside of an isolated environment, and adjusting a pressure inside of the isolated environment.

In another embodiment, the method includes adjusting the pressure while heating the scented liquid so that the scented liquid is in the form of steam when activating the electrode the electrode to cause the fishing lure to attract the ions from the scented liquid.

In another embodiment, the method includes sealing the fishing lure inside of an isolated environment before activating the electrode.

In another general example embodiment, a method of applying a scent to a fishing lure includes attaching the fishing lure to an attachment mechanism suspended within an inner space of a body, isolating the inner space of the body from an outside environment, heating a scented liquid to create steam within the inner space of the body, and enabling the steam to contact the fishing lure.

In another embodiment, the method includes adjusting a pressure inside of the inner space.

In another embodiment, adjusting the pressure includes pumping the steam into the inner space.

In another embodiment, the method includes curing the fishing lure after allowing the steam to contact the fishing lure.

In another embodiment, curing the fishing lure include applying UV light to the fishing lure.

BRIEF DESCRIPTION OF THE DRAWINGS

Embodiments of the present disclosure will now be explained in further detail by way of example only with reference to the accompanying figures, in which.

DETAILED DESCRIPTION

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

The present disclosure relates to methods and apparatuses for embedding a scent in a fishing lure. As understood by those of ordinary skill in the art, a fishing lure is typically placed at the end of a fishing line and includes a hook designed to attach to a fish when the fishing lure is bitten by the fish. Though the present disclosure is directed to fishing lures, those of ordinary skill in the art may recognize other applications of the methods and apparatuses discussed herein. For example, in an embodiment, the methods and apparatuses of the present disclosure can be used to embed a scent into a piece of clothing worn by a swimmer.

Figure 1:
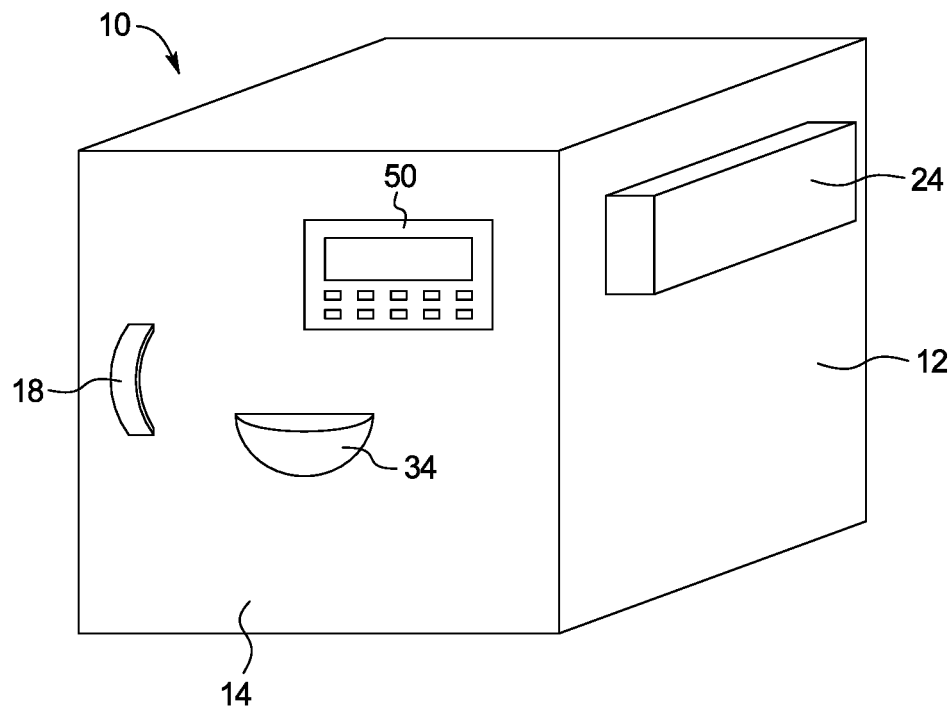
FIG. 1 is a perspective view of an example embodiment of a scent application device in accordance with the present disclosure in a closed configuration.
Figure 2:
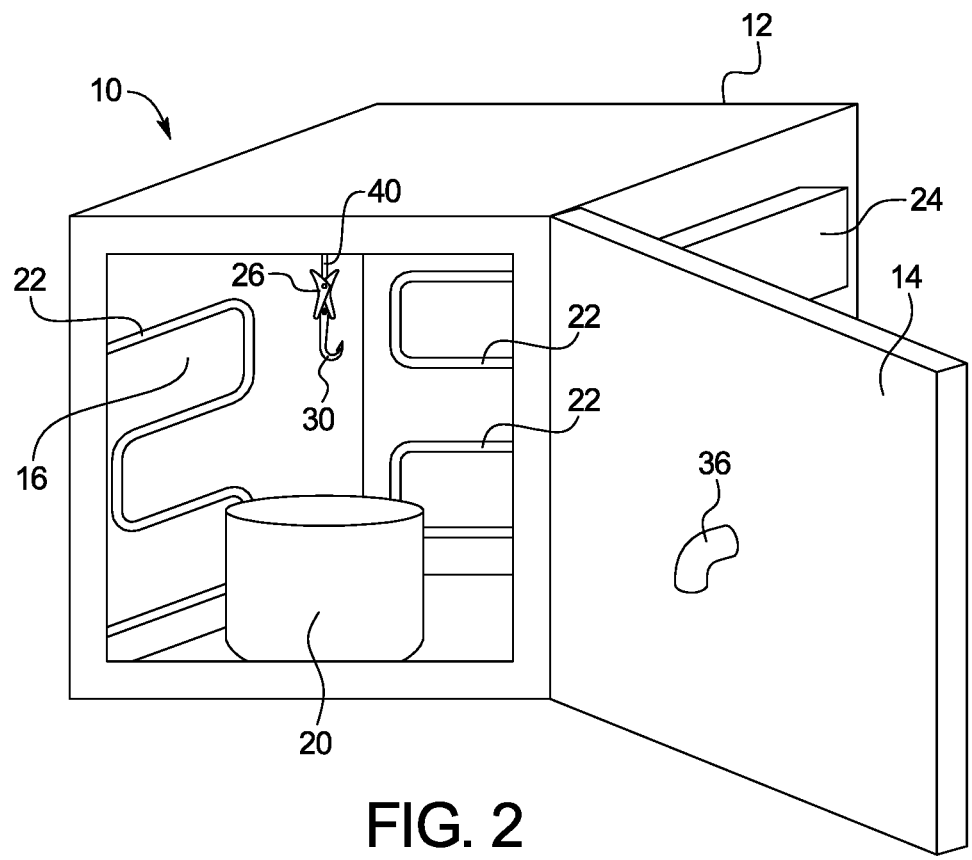
FIG. 2 is a perspective view of the scent application device of FIG. 1 in an open configuration.
Figure 3:
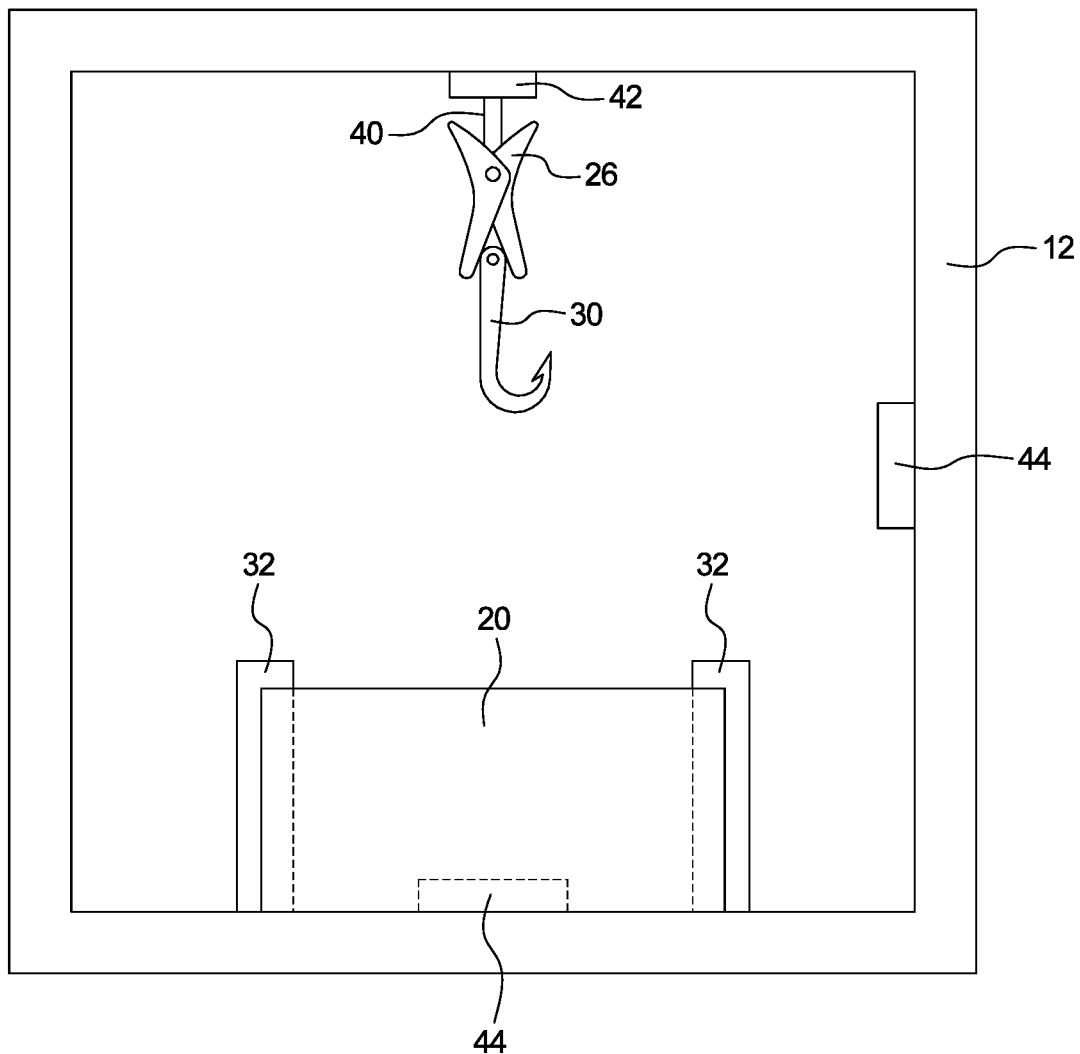
FIG. 3 is a front plan view of the scent application device of FIG. 1 in an open configuration.

FIGS. 1 to 3 illustrate an example embodiment of a scent application device 10 according to the present disclosure. In the illustrated embodiment, device 10 includes a body 12 and a door 14 with a handle 18. When door 14 is closed as illustrated in FIG. 1, an inner space 16 of body 12 is sealed off from the environment outside of body 12. Sealing of the inner space 16 by door 14 creates an isolated environment for a scent to be applied to a fishing lure 30.

FIGS. 2 and 3 show an example embodiment of a configuration inside of inner space 16 of body 12. In the illustrated embodiment, device 10 includes a liquid scent container 20, a heating mechanism 22, a pressurization mechanism 24, and a lure attachment mechanism 26.

Container 20 is a container for a scented liquid. The scented liquid can include, for example, commercially available oil or non-oil based scents extracted for example from shad, crayfish, baitfish, worms and/or other water-oriented creatures and/or liquid that has been infused with a bait scent. Those of ordinary skill in the art will recognize scented liquids that can be used.

Container 20 can be filled with the scented liquid by opening door 14 and pouring the scented liquid into container 20, or by pouring the scented liquid into container 20 with door 14 already closed. In the illustrated embodiment, an outer surface of door 14 includes a liquid receiving dish 34 in fluid communication with a spout 36 on the inner surface of door 14. A user can therefore close door 14 and pour the scented liquid into liquid receiving dish 34, and the scented liquid will be guided through spout 36 and into container 20. In an embodiment, spout 36 can be sealed so that inner space 16 is isolated from the outside environment when the scented liquid is not being poured into container 20. In an embodiment, device 10 can include multiple containers 20, multiple receiving dishes 34 and/or multiple spouts 36, enabling multiple different scents to be embedded at the same time. Liquid receiving dish and spout 36 can be included on any surface of body 10.

Heating mechanism 22 is configured to raise or lower the temperature within inner space 16. Heating mechanism 22 can include, for example, heating coils located on or within the inner walls, lower surface and/or upper surface of body 12. In an embodiment, heating mechanism 22 can include a heating portion 32 of container 20 that directly contacts the scented liquid within container 20 to cause steam to be created from the scented liquid.

Pressurization mechanism 24 can be used to create a positive pressure or a negative pressure within inner space 16. In an embodiment, pressurization mechanism includes a vacuum pump that is configured to pump air into inner space 16 to increase the pressure within inner space 16 when inner space 16 is isolated from the outside environment and/or to pump air out of inner space 16 to decrease the pressure within inner space 16 when inner space 16 is isolated from the outside environment. In an embodiment, pressurization mechanism 24 can pressurize inner space 16 with a compressed or pressurized gas, for example, carbon dioxide.

Figure 4:
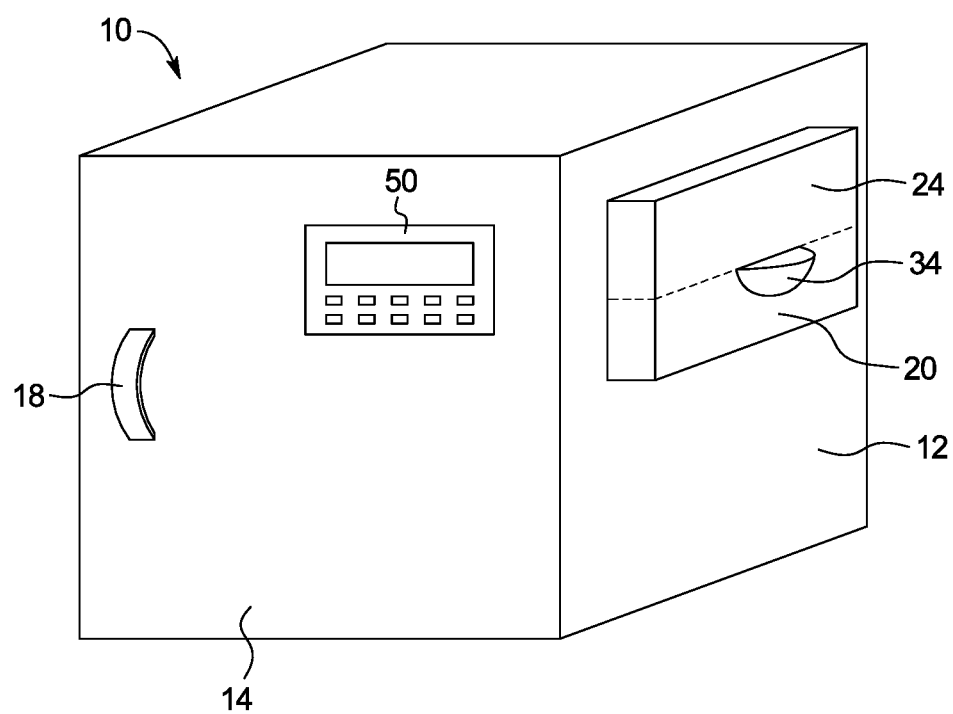
FIG. 4 is a perspective view of an example embodiment of a scent application device in accordance with the present disclosure in an open configuration.

In the alternative embodiment illustrated in FIG. 4, container 20 is located outside of inner space 16 as part of pressurization mechanism 24. A heating mechanism 22 can cause scented liquid within container 20 to create steam, which steam can then be pumped into inner space 16 by pressurization mechanism 22 to create positive pressure within inner space 16.

A fishing lure 30 can be attached to attachment mechanism 26 and sealed inside of inner space 16 by closing door 14. In the illustrated embodiment, attachment mechanism 26 includes a clamp that can clamp onto a fishing lure to suspend the fishing lure within inner space 16. Those of ordinary skill in the art will recognize other attachment mechanisms that can be used besides a clamp, for example, a hook, a sling, or the like. In the illustrated embodiment, attachment mechanism 26 hangs from the top of body 12 to expose a maximum amount of surface area of fishing lure 30 for application of a scent. Those of ordinary skill in the art will also recognize that other configurations are possible.

In the illustrated embodiment, attachment mechanism 26 hangs from the upper surface of body 12 by a cord 40. In an embodiment, cord 40 may enable attachment mechanism 26 to be raised or lowered so that fishing lure 30 can be dipped into the liquid residing in container 20. In another embodiment, attachment mechanism 26 can be kept stationary or in a raised configuration so that fishing lure 30 hangs in the middle of inner space 16 to enable a scent to be added to fishing lure 30 via steam. In an embodiment, device 10 can include multiple attachment mechanisms so that multiple fishing lures 30 can have a scent applied at the same time.

In an embodiment, cord 40 and/or attachment mechanism 26 can be part of a conductive element formed of a conductive material. A metal such as copper, silver, gold, aluminum, zinc, nickel, brass, bronze, iron, platinum, steel or lead, or an alloy or mixture thereof, for example, can be included as part or all of cord 40 and/or attachment mechanism 26 to provide a conductive element. A fishing lure 30 can then be hung from attachment mechanism 26, and an electrical or magnetic charge can be applied to the fishing lure 30 via cord 40 and/or attachment mechanism 26, for example, to create a positive or negative charge within fishing lure 30, to cure a liquid scent applied to fishing lure 30, and/or to cause fishing lure 30 to attract an ionized scent.

In an embodiment, the scented liquid can contain a salt solution with the ability to separate into positive and negative ions. For example, the scented liquid can include sodium chloride or potassium chloride. Those of ordinary skill in the art will recognize other salt solutions that can be used with device 10.

To apply a charge to the fishing lure 30, cord 40 and/or attachment mechanism 26 can be conductively connected to an electrode 42 and/or can include electrode 42 as a part thereof. In an embodiment, the electrode 42 can be an anode or a cathode. In an embodiment, electrode 42 is one of an anode or a cathode, while another electrode 44 located within container 20 or elsewhere inside of inner space 16. As explained in more detail below, when the anode and cathode are activated, positive ions can be attracted to the cathode and negative ions can be attracted to the anode. Thus, by applying a positive or negative charge to fishing lure 30 held by attachment mechanism 26, device 10 can cause positive or negative ions to be attracted to fishing lure 30, for example, to attract the scent to fishing lure 30 or cure a scent applied to the fishing lure 30.

In the embodiment in which fishing lure 30 is dipped into scented liquid in container 20, one of an anode and a cathode can be used to apply a positive or a negative charge to fishing lure 30, while the other of an anode and a cathode can be located within container 20. The anode and cathode can then be activated to cause positive or negative ions from the scented liquid to attach to fishing lure 30. The type of ions attracted to fishing lure 30 will depend on whether a positive or negative charge is applied to fishing lure 30.

In the embodiment in which fishing lure 30 hangs in the middle of inner space 16 to enable a scent to be added to fishing lure 30 via steam, one of an anode and a cathode can be used to apply a positive or a negative charge to fishing lure 30, while the other of an anode and a cathode can be located elsewhere inside of inner space 16. When the scented liquid is heated to create steam, the anode and cathode can be activated to cause positive or negative ions from the steam to attach to fishing lure 30.

In the illustrated embodiment, door 14 of device 10 includes a user interface 50 and control unit 52 to control the various elements of device 10. Control unit 52 can include a processor and a memory, which can include a non-transitory computer readable medium. In an embodiment, the memory can store optimized settings for adding a scent to a fishing lure. In an embodiment, a user can use user interface 50 to program device 10 to operate at different temperatures and/or pressures and/or can use user interface 50 to apply an electrical or magnetic charge to a fishing lure within inner space 16.

Figure 5:
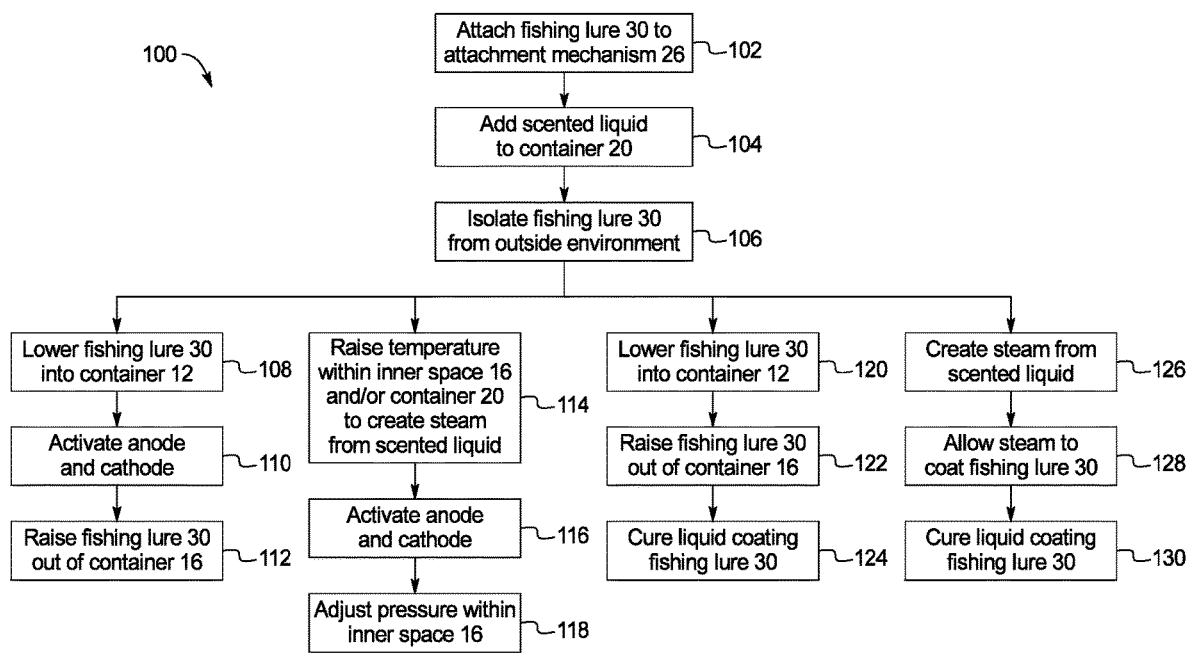
FIG. 5 is an example embodiment of a control method that can be performed using the scent application device of the present disclosure.

FIG. 5 shows a control method 100 for operating device 10 to add a scent to a fishing lure 30. Those of ordinary skill in the art will recognize that several of the steps can be performed in different orders and/or omitted from the method.

At step 102, a fishing lure 30 is attached to attachment mechanism 26. Attachment can be via a clamp or other attachment mechanism as described above, and can place fishing lure 30 in conductive communication with an electrode 42.

At step 104, a scented liquid is added to container 20. The scented liquid can be premixed or mixed within container 20. In an embodiment, water can be mixed with a powder or liquid concentrate within container 20 to create the scented liquid.

At step 106, inner space 16 of body 12 is sealed from the outside environment, isolating fishing lure 30 within inner space 16. Sealing inner space 16 from the outside environment allows the temperature and pressure within inner space to be precisely controlled, and also prevents the scent from escaping device 10 when steam is created.

Depending on how the scent is to be applied to the fishing lure 30, method 100 can then proceed to any of steps 108, 114, 120 or 126. In an embodiment, one or more of steps 108, 114, 120 or 126 is enabled by device 10, and a user can modify how the scent is applied by selecting options using user interface 50.

If fishing lure 30 is to be dipped into scented liquid in container 20, and the scented liquid is to then be applied using an electrode 42 such as an anode or cathode, cord 40 can cause fishing lure 30 to be lowered at step 108. At step 110, the anode and cathode can be activated so that ions of the scented liquid separate, with the positive ions being attracted to the cathode and the negative ions being attracted to the anode. The fishing lure 30 can then be raised from the scented liquid at step 112 and retain the positive or negative ions attracted thereto by the anode or cathode. The temperature can also be increased by heating mechanism 22 to cure the liquid retained on fishing lure 30, the pressure within inner space can be adjusted by pressurization mechanism 24 to cure the liquid retained on fishing lure 30, an electrical or magnetic charge can be applied to fishing lure 30 via electrode 42 or a magnet to cure the liquid retained on fishing lure 30, and/or another curing mechanism can be used.

If the scent is to be applied to fishing lure 30 via steam, then the method proceeds to step 114 so that the control unit 52 causes heating mechanism 22 to raise the temperature within inner space 16 and/or container 20 to create steam from the scented liquid. The steam can then be caused to attach a scent to the fishing lure 30 via the anode and cathode and/or via pressurization. To cause the steam to attach the scent to fishing lure 30 via the anode or cathode, control unit 52 activates the anode and cathode at step 116 so that ions of the scented steam separate, with the positive ions being attracted to the cathode and the negative ions being attracted to the anode. To cause the steam to attach the scent to fishing lure 30 via pressurization, control unit 52 activates pressurization mechanism 24 at step 118 to create a positive or negative pressure within inner space 16. The temperature can also be further increased by heating mechanism 22 to cure the liquid on fishing lure 30, the pressure within inner space can be adjusted by pressurization mechanism 24 to cure the liquid retained on fishing lure 30, an electrical or magnetic charge can be applied to fishing lure 30 via electrode 42 or a magnet to cure the liquid retained on fishing lure 30, and/or another curing mechanism can be used.

If fishing lure 30 is to be dipped into scented liquid in container 20 without activating an anode or cathode, cord 40 can cause fishing lure 30 to be lowered at step 120. Fishing lure 30 can then be raised from the scented liquid at step 122 with a coating of scented liquid. The scented liquid coating fishing lure 30 can then be cured by raising the temperature with heating mechanism 22, by adjusting the pressure within inner space 16 using pressurization mechanism 24, by applying an electrical or magnetic charge to fishing lure 30 using electrode 42 or a magnet, and/or using another curing mechanism.

If the scent is to be applied to fishing lure 30 via steam without activating an electrode, then the method proceeds to step 126 so that the control unit 52 causes heating mechanism 22 to raise the temperature within inner space 16 and/or container 20 to create steam from the scented liquid. The steam can be created within inner space 16 or can be pumped into inner space 16 by pressurization mechanism 22 to simultaneously adjust the pressure within inner space 16. After a period of time allowing the steam to contact fishing lure 30 at step 128, the temperature can be increased further by heating mechanism 22 to cure the steam attracted to fishing lure 30 at step 130, the pressure within inner space can be adjusted by pressurization mechanism 24 to cure the liquid retained on fishing lure 30, an electrical or magnetic charge can be applied to fishing lure 30 via electrode 42 or a magnet to cure the liquid retained on fishing lure 30, and/or another curing mechanism can be used.

In an alternative embodiment, the liquid or steam contacting fishing lure 30 can be cured, for example, by UV lights positioned to direct ultraviolet ("UV") energy towards fishing lure 30 within inner space 16. In another embodiment, an electrical or magnetic charge applied to fishing lure 30 by electrode 42 can be used to cure the liquid or steam. Those of ordinary skill in the art will recognize other methods of curing liquid or steam contacting fishing lure 30

The steps above can be performed in a sequence, simultaneously, or in any combination. By performing two or more of steps simultaneously, the strength of the scent attached to fishing lure 30 can be increased. In an embodiment, a user can use user interface 50 to precisely control which steps occur and at what temperatures, pressures and voltages they occur at.

In an embodiment, device 10 can be operated without any scented liquid so as to apply a charge to a fishing lure without adding a scent so that the charged fishing lure can be used to attract fish. It is believed that certain types of fish may sense the charge of the fishing lure and therefore be more likely to bite the fishing lure. Many fish use the principle of electroreception to perceive electrical stimuli, so adding a charge to the fishing lure may make the fishing lure more attractive to or more easily recognized by certain types of fish, regardless of any additional scent retained by the fishing lure.

In an embodiment according to the present disclosure, fishing lure 30 can be formed with a battery operated device therein to create a pulsed signal.

In an embodiment, a waterborne device other than a fishing lure can be impregnated with a scent. For example, it may be advantageous for a swimmer to embed a wetsuit or other waterborne device worn or carried by the swimmer with a scent that would repel fish such as sharks from the swimmer. In an embodiment, the other waterborne device could be an armband, legband or surfboard attachment that can attach to a swimmer or surfboard to repel fish such as sharks. In an embodiment, the waterborne device can be a device that removably attaches to the swimmer, swimmer's clothing or surfboard, for example, by hook and loop material or another type of attachment.

In an embodiment, the wetsuit or other waterborne device can be attached to attachment mechanism 26 as described with respect to fishing lure 30 above. Device 10 can then be operated as described above to embed the scent in the wetsuit or other waterborne device using the method described above.

In an embodiment, the wetsuit or other waterborne device can include a conductive element or network that can be placed in conductive communication with an electrode by attachment mechanism 26 as described with respect to fishing lure 30 above. Device 10 can then be operated as described above to embed the scent in the wetsuit or other waterborne device using the method described above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device for applying a charge to a fishing lure, the device comprising:
   at least one electrode;
   a conductive element configured to place the fishing lure in conductive communication with the at least one electrode; and
   a control unit configured to activate the at least one electrode to cause the at least one electrode to impart a charge on the fishing lure via the conductive element.

2. The device of claim 1, which includes a container for a scented liquid.

3. The device of claim 2, wherein the conductive element places the fishing lure in conductive communication with one of a cathode or an anode, and wherein the container includes the other of the cathode and the anode.

4. The device of claim 2, which includes a heating mechanism to create steam from the scented liquid, and wherein ions from the steam are attracted to the fishing lure when the charge is imparted on the fishing lure by the at least one electrode.

5. The device of claim 4, wherein the heating mechanism includes a portion that directly contacts the scented liquid within the container.

6. The device of claim 1, which includes a pressurization mechanism configured to adjust the pressure within an inner space of a body including the conductive element.

7. The device of claim 6, wherein the pressurization mechanism is configured to adjust the pressure within the inner space by pumping steam into the inner space.

8. The device of claim 1, wherein the conductive element places the fishing lure in conductive communication with one of a cathode or an anode, and wherein the other of the cathode or the anode is located elsewhere within an inner space of a body including the conductive element.

9. A device for adding a scent to a fishing lure, the device comprising:
   at least one electrode;
   a source of scented liquid;
   a heating mechanism; and
   a control unit configured to (i) activate the at least one electrode to cause the at least one electrode to impart a charge on the fishing lure, and (ii) create steam from the scented liquid, wherein ions from the steam are attracted to the fishing lure when the charge is imparted on the fishing lure by the at least one electrode.

10. The device of claim 9, which includes a conductive element that places the fishing lure in conductive communication with one of a cathode or an anode, and wherein the source of scented liquid includes the other of the cathode and the anode.

11. A method of adding a scent to a fishing lure, the method comprising:
   placing a fishing lure in conductive communication with an electrode;
   placing the fishing lure in contact with or in proximity to a scented liquid; and
   activating the electrode to cause the fishing lure to attract ions from the scented liquid.

12. The method of claim 11, which includes placing the fishing lure in contact with the scented liquid.

13. The method of claim 11, which includes lowering the fishing lure into contact with the scented liquid.

14. The method of claim 11, which includes heating the scented liquid so that the scented liquid is in the form of steam when activating the electrode to cause the fishing lure to attract the ions from the scented liquid.

15. The method of claim 11, which includes sealing the fishing lure inside of an isolated environment, and adjusting a pressure inside of the isolated environment.

16. The method of claim 15, which includes adjusting the pressure while heating the scented liquid so that the scented liquid is in the form of steam when activating the electrode the electrode to cause the fishing lure to attract the ions from the scented liquid.

17. The method of claim 11, which includes sealing the fishing lure inside of an isolated environment before activating the electrode.

* * * * *